Feb. 22, 1944. F. H. MOREHEAD ET AL 2,342,422
HIGH PRESSURE JOINT
Filed May 5, 1942
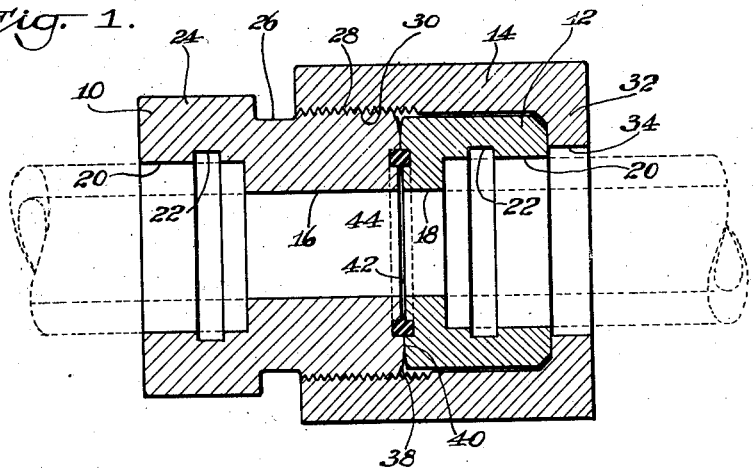
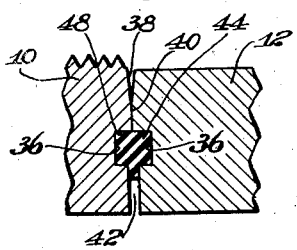
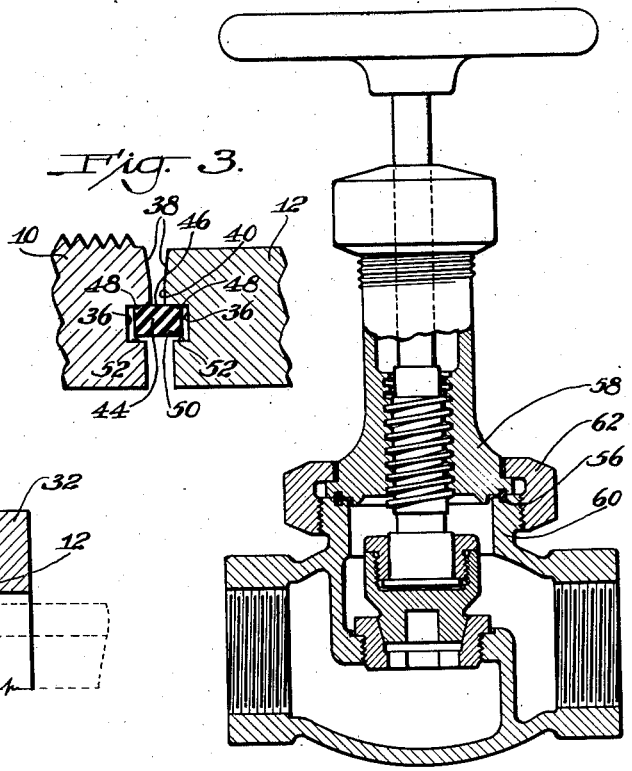
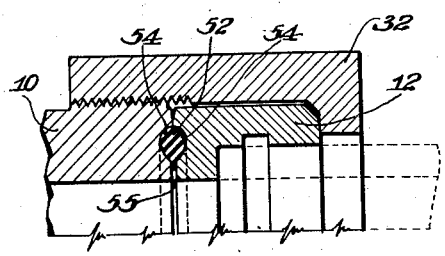
INVENTORS
FRENCH H. MOREHEAD & WILLIAM R. OST.
BY Albert J. Henderson
ATTORNEY.

Patented Feb. 22, 1944

2,342,422

UNITED STATES PATENT OFFICE 2,342,422

HIGH PRESSURE JOINT

French H. Morehead, Riverside, Conn., and William R. Ost, Verona, N. J., assignors to Walworth Patents Inc., Boston, Mass., a corporation of Massachusetts Application May 5, 1942, Serial No. 441,792

3 Claims. (Cl. 285—1)

This invention relates to fluid seal joints and more particularly to separable joints for pipes, valves and like devices for conducting or containing fluids under high pressures.

Joints of the type described are extremely difficult to maintain fluid tight when assembled for services where a combination of high line pressures and vibration or shock tending to separate the joint faces is encountered. In marine construction particularly, the pipe lines and valves are subject to constant vibration and occasional shock requiring the utmost precaution and vigilance against leakage of liquid or gaseous fluids from this equipment.

Various form of separable joints have gaskets occupying part of the contact faces for sealing purposes. In some types chief reliance is placed upon close frictional contact between the metallic joint surfaces to resist relative rotation and loosening of the joint, the gasket exerting only a relatively slight pressure against the joint surfaces and being incapable of maintaining tightness and freedom from leakage in such constructions.

It has also been proposed to locate a flexible or deformable gasket intermediate the joint surfaces and introduce pressure fluid therebetween to press the gasket either bodily or by deformation thereof, into seating relation with the joint surfaces. If the force exerted by the gasket under fluid pressure is all that resists torsion in the joint, then such resistance is quite ineffective to prevent loosening and resultant leakage. Where frictional contact between the metallic joint surfaces is also relied upon to resist torsion, any lessening of the contact will produce the same results as in the previous instance. As the gasket in these developments does not exert any great force against the joint surfaces, continual vibration or shock will soon cause the undesired loosening.

The chief objects of this invention are to connect pipes, valves and like fluid conveying devices with separable means without danger of leakage at the joint; to maintain a fluid seal joint under unfavorable conditions of impact or constant vibration; to utilize the pressure of the line fluid or other pressure medium to enhance the sealing effect; to create high frictional contact at the joint surfaces without undue compressive action or over-stressing one member to obtain a tight joint; to secure immunity from leakage at much higher line pressures than has heretofore been possible; to obtain a pressure tight joint which does not depend upon precision machining operations on the joint surfaces or elsewhere; to render the joint unaffected by wide variations in temperature, either external or internal; and to obtain a pressure tight construction which will be retained in the presence of chemical fluids.

Other objects and advantages will become apparent from the following description taken in connection with the accompanying drawing wherein:

Fig. 1 is a longitudinal section of the joint,

Fig. 2 is an enlarged fragmentary section,

Fig. 3 is a view similar to Fig. 2 but showing parts separated,

Fig. 5 is a partial longitudinal sectional view of another embodiment, and

Fig. 5 is a front elevation, partly in section, of a globe valve showing the joint applied thereto.

Referring more particularly to the drawing, Fig. 1 shows a pipe union having a threaded end 10 and a swivel end 12 connected together by means of a nut 14. An opening 16 extends axially through the threaded end 10 and a similar opening 18 is provided in the swivel end 12. Suitable pipe connecting means are provided for the threaded end 10 and swivel end 12 which, in this instance, take the form of counterbores 20 for the outer ends of the fluid openings 16 and 18 and being provided with annular recesses 22 for the reception of suitable brazing material. The connection and process of forming the same may utilize the features of Patent No. 2,050,728, but it will be understood that other pipe connecting means, including the common threaded arrangement could be substituted if desired.

The threaded end 10 may more particularly comprise a polygonal head 24 and an exteriorly threaded portion 28 connected by an intermediate neck portion 26. The swivel end 12 is cylindrical in form and slightly smaller in outer diameter than the threaded portion 28. The nut 14 may have a polygonal exterior surface and be provided with an axial opening 30, partly threaded for engagement with the threaded portion 28, and with the unthreaded portion providing clearance for the swivel. The opening 30 terminates at a flange 32 adapted to engage with the outer face of the swivel end 12 and serving to clamp the parts together when the threaded portions are sufficiently engaged. The flange 32 has an axial bore 34 somewhat larger than the bore 20 to afford clearance for the pipe. While a union type of joint is shown and described it will be apparent that other types may be substituted and that a bolted and flanged construction would serve the purpose of this invention as well as the threaded portion and nut.

This invention is more particularly directed toward the provision of means for avoiding leakage of fluid under pressure from openings 16 and 18 constituting the fluid passageway, which leakage may occur between the inner end faces of the threaded end 10 and swivel end 12. Furthermore, loosening of the parts of the union and separation of these faces when vibration or shock occurs in the pipe line is also to be avoided. To this end, each of the inner end faces described is provided with an annular recess 36 shown more clearly in Figs. 2 and 3 and formed substantially midway between the fluid openings 16 and 18 and the outer peripheries of these parts. In the preferred embodiment, the recesses 36 are rectangular in cross section but, as will appear hereinafter, other shapes may be used. Outwardly of each recess 36 the inner end faces are substantially flat, but may be provided with chamfered portions 38 reducing the area of contact to annular portions adjacent the recess 36 and designated as joint faces 40 hereinafter. Inwardly of the recesses 36 the end faces lie below the plane of joint faces 40 forming relief surfaces spaced from each other. Due to such spacing, an annular passage 42 is provided between these relief surfaces extending from the fluid openings 16 and 18 to the recesses 36. The relief surfaces are preferably flat, as in the case of joint faces 40, but may have angular relation to each other or to the joint faces 40 without altering the essential character of the invention.

The recesses 36 together form a chamber for the accommodation of a sealing ring 44. As shown in Fig. 3, the sealing ring 44 has an outer diameter closely approximating that of the chamber, while the inner diameter thereof is preferably slightly larger than the inner diameter of the chamber. Thus, when the ring is in position the outer periphery 46 thereof engages closely with the outer wall 48 of the chamber while the inner periphery 50 of the sealing ring is slightly spaced from the inner wall 52 of the chamber.

The sealing ring 44 in this embodiment is rectangular in cross section and, as follows from the previous description of the preferred form, the width thereof is slightly less than the width of the chamber formed by the recesses 36. The depth of the sealing ring 44 is, however, somewhat greater than the depth of the chamber as will be apparent from the enlarged view of Fig. 3 showing the parts separated. As the sealing ring is of resilient and substantially incompressible nature, being of rubber or rubber-like material, it will completely fill the chamber when the parts are clamped together and the excess volume will overflow into the annular passage 42 and occupy part of the passage 42 as indicated in Fig. 2. Due to the provision of the annular passage 42 opposite the joint faces 40, the sealing ring 44 is always deformed in a fixed direction, that is, toward the fluid passages 16 and 18 while exerting sealing pressure against the chamber walls in all directions. The ring 44 is soft and resilient and, being substantially incompressible, the fluid under pressure in openings 16 and 18 entering the annular passage 42 will tend to force the ring 44 back into the chamber. Thus, when the joint faces 40 are brought into contact upon tightening of the nut 14, the sealing ring 44 initially exerts pressure against the walls of the chamber due to its own resiliency and this pressure is increased by the force exerted by the fluid pressure on the ring 44. This force will be in all directions throughout the ring 44 and will be of such magnitude that vibration and shock will not cause loosening of the nut 14 resulting in separation of the joint faces. The clamping pressure on the parts need not be excessive to achieve the result as long as sufficient friction occurs between the joint faces to resist torsion. Under test, such joints of one inch size have withstood an internal fluid pressure of 10,000 pounds per square inch without leaking at the joint faces by merely hand tightening the nut 14 without use of wrenches or other tools.

In making up the joint described it is unnecessary to overstress any of the parts in order to secure freedom from leakage. None of the parts is stressed beyond its elastic limit and all are maintained in a condition of comparatively low stress for such types of joint. The deformable ring 44 is capable of compensating for changes in temperature caused by changes in the fluid or exterior temperature and will maintain a seal against leakage over a wide range of temperatures.

In high pressure piping it is advantageous to be able to separate a joint without resorting to bending of the pipe or cutting it. Due to the provision of the flat surfaces at the joint faces it is only necessary to remove the nut 14 from the engagement with the threads on the threaded end 10 and slight movement of the parts will serve to separate the connected pipes. Similar advantage results when flanged and bolted construction is used. The contours of the sealing ring and chamber are not important as long as they are similar and the volume of the ring is greater than the volume of the chamber wherein it is placed. In Fig. 4 a sealing ring 52 of circular cross-section and formed of rubber or rubber-like material is shown as deformed within a chamber of tear-drop form provided by suitable recesses 54 formed in the threaded end 10 and swivel end 12 as in the previous embodiment. The cross-sectional area of the ring is larger than that of the chamber formed by the recesses 54 to afford an excess volume to be extruded into the annular space 55 similar to that of the previous embodiment. The sealing ring could equally well be elliptical and other suitable forms will occur to those skilled in the art. While, in the general usage of the invention, metallic materials are used for the parts 10, 12 and 14 it will be apparent that a variety of materials may be selected from to resist the chemical action of the fluid in the piping or container.

In Fig. 5, the sealing ring 56 is shown as contained between joint faces, formed on a valve bonnet 58 and a valve body 60 respectively, clamped together by the union ring 62. The arrangement of the joint faces outwardly of the chamber and annular passage inwardly thereof may be identical with those described in connection with the embodiment of Fig. 1. Such application is one of many other applications of the fluid seal joint which will be apparent to those skilled in the art and it is to be understood that the illustrative embodiments are not to be taken as limiting the scope of this invention as set forth in the appended claims.

We claim:

1. A joint for pipes, valves and like fluid conducting members, comprising a pair of coaxial members at least one of which has an axial opening for fluid under pressure, each member having an annular recess intermediate the fluid opening and the exterior of the member forming together an annular chamber, said members having surfaces in joint contact between the chamber and said exterior and having relief surfaces between said chamber and the axial opening, the opposite bottom walls of said chamber being substantially equidistant from the said surfaces, a sealing ring of deformable but substantially incompressible material located within said chamber and having a depth greater than that existing between the bottom walls of said chamber when said joint contact is established, and means for releasably connecting said members together to establish said joint contact and place said ring under pressure between said bottom walls causing it to deform and substantially fill said chamber, said ring thereby exerting pressure on the walls of said chamber to resist torsion tending to release said members and additionally being subjected to the pressure of said fluid entering between said relief surfaces and applying a force on said ring substantially midway of said opposite bottom walls.

2. Apparatus in accordance with claim 1 wherein the sealing ring is deformed on the inner but not the outer periphery thereof under pressure applied by said connecting means.

3. Apparatus in accordance with claim 1 wherein the sealing ring is deformed on the inner but not the outer periphery thereof under pressure applied by said connecting means and has an extruded portion on said inner periphery located between said relief surfaces substantially midway of said opposite bottom walls.

FRENCH H. MOREHEAD.
WILLIAM R. OST.